United States Patent [19]
Zebold

[11] Patent Number: 5,566,029
[45] Date of Patent: Oct. 15, 1996

[54] ROTATABLE MIRROR ASSEMBLY

[75] Inventor: David F. Zebold, Katy, Tex.

[73] Assignee: Moto Mirror Inc.

[21] Appl. No.: 792,460

[22] Filed: Nov. 15, 1991

[51] Int. Cl.$^6$ .............................. G02B 7/182; B60R 1/06
[52] U.S. Cl. .......................... 359/872; 359/877; 248/478; 248/486
[58] Field of Search ...................... 359/872, 873, 359/874, 876, 877, 881, 841; 248/476, 477, 478, 479, 480, 485, 486, 900

[56] References Cited

U.S. PATENT DOCUMENTS

| | | |
|---|---|---|
| 3,005,384 | 10/1961 | Baird . |
| 3,132,201 | 5/1964 | Bertell . |
| 3,429,639 | 2/1969 | Peters ........................................ 359/877 |
| 3,730,474 | 5/1973 | Bowers . |
| 3,830,561 | 8/1974 | La Fave et al. ........................ 359/877 |
| 4,135,694 | 1/1979 | Stegenga . |
| 4,295,708 | 10/1981 | Albrecht et al. ........................ 359/877 |
| 4,315,614 | 2/1982 | Stegenga . |
| 4,456,333 | 6/1984 | Hewitt ................................... 359/877 |
| 4,464,016 | 8/1984 | Weber . |
| 4,504,116 | 3/1985 | Sharp ..................................... 359/877 |
| 4,609,265 | 9/1986 | McKee et al. ......................... 359/877 |
| 4,786,156 | 11/1988 | Kotani . |
| 4,787,726 | 11/1988 | Hendricks .............................. 359/877 |
| 4,919,526 | 4/1990 | Umekawa et al. ..................... 359/877 |

FOREIGN PATENT DOCUMENTS

| | | | |
|---|---|---|---|
| 0077256 | 3/1987 | Japan ..................................... 359/877 |
| 2186246 | 8/1987 | United Kingdom .................... 359/872 |
| 8901427 | 2/1989 | WIPO .................................... 359/877 |

OTHER PUBLICATIONS

Moto Mirror Inc brochure 1990.

Primary Examiner—Ricky D. Shafer
Attorney, Agent, or Firm—Charles W. McHugh

[57] ABSTRACT

A mirror assembly adapted to be rotatably mounted with respect to a support structure such as a wheeled vehicle of the class that includes trucks, tractors, large recreational vehicles, etc. A rotatable housing carries a mirror and there is a fixed mounting bold for supporting the housing. A motor is connected to the housing so as to rotate it when power is applied to the motor. A clutch is associated with the motor in order to preclude damage if power is applied to the motor but the housing is incapable of moving. The clutch includes two pairs of metallic spring washers which are of the Belleville type and which have concave faces. The two washers of each pair are in contact and are oriented in the same direction, so that there is a substantial area of metal-to-metal contact between the washers of each pair of washers. A lubricant such as graphite is interposed between the pairs of Belleville washers. When the motor is a high-speed electrical motor, there is included a transmission for affecting the rate at which the housing will rotate with respect to the mounting bolt when power is applied to the motor, such that the motor may rotate at a relatively high speed (e.g., 6,000 RPM) but the housing will rotate at a relatively low speed (i.e., ½ RPM).

27 Claims, 3 Drawing Sheets

ROTATABLE MIRROR ASSEMBLY

FIELD OF THE INVENTION

In general, this invention relates to relatively large rotatable mirrors, such as those that are commonly used as external mirrors on vehicles such as trucks, buses, large recreational vehicles and the like, wherein a mirror assembly is supported by a C-shaped bracket and two widely spaced, co-axial bolts; more specifically, it relates to an assembly that is capable of being rotated by a motor about an axis in either of two opposite directions, in response to control signals generated at a remote location.

BACKGROUND OF THE INVENTION

There are many instances in which a relatively large mirror is needed in order to provide visibility to an operator who cannot be present at a location to observe something directly with his or her eyes. A very common situation in which this occurs is when the driver of a large vehicle needs to see what is happening alongside or behind the vehicle before backing or making a maneuver such as a turn. Hence, this invention will be described as if it were being used on a large vehicle like a truck, but it should be understood that the mirror assembly could also be advantageously used in other environments, including trains, boats, or even static devices. For example, the operator of a large machine may have a need to adjust the position of a mirror so that the intake or output of the machine can be personally monitored. If the machine is subject to the same kind of vibration that a large truck experiences, then the machine operator may need a mirror in much the same way that the driver of a truck does. So the mirror assembly disclosed herein should be recognized as having utility in essentially static situations as well as mobile ones.

Relatively large vehicles such as trucks, buses, large recreational vehicles and the like have requirements for external mirrors that are significantly different than those for automobiles and motorcycles. In the case of large trucks and the tractors that provide the motive power for multi-wheel rigs (e.g., 18-wheel rigs), there are rather extreme vibrations that attend a vehicle's travel along highways at speeds in the neighborhood of 55 miles per hour. To deal with such vibrations, there has developed what amounts to an industry standard for external mirrors, namely, that a large and generally rectangular mirror be supported at its top and its bottom by a bracket that is firmly anchored to the tuck or tractor. The bracket may be best described as being essentially C-shaped, with the opening of the "C" facing toward the vehicle. Such brackets are sometimes referred to as "West Coast" brackets. Near the distal ends of the C-shaped bracket, two apertures are provided at locations such that two spaced bolts (and complementary nuts) may be employed to secure a mirror assembly at its top and bottom. The two spaced and aligned bolts define a generally vertical axis that passes longitudinally through a rectangular mirror housing that is usually about 17 inches tall.

It has been common to provide for adjustment of such a truck mirror about its vertical axis—both to the right and to the left, because truck drivers come in all shapes and sizes, and their respective lines of sight to a mirror may vary significantly. For a mirror assembly that is located on the driver's side of a cab, it might be possible to simply reach out and grab the mirror and physically twist it against whatever restraining force is realized from the mounting bolts. But if it is raining or snowing, there's little pleasure in the chore of rolling down a window and reaching out to push or pull on one edge of a mirror. In the case of the mirror on the right (or passenger) side of a truck, there is no way that a driver could safely reach all the way across the cab to make an adjustment. Of course, in automobiles and in truck cabs that do not tilt, it might be possible to connect certain mirrors with flexible cables, so that a driver might twist a know that is connected to one end of a cable and rotate a mirror at the other end of the cable. But with large mirrors that are subject to wind loads and road vibration, the mirrors must usually be held so tightly by their mounting bolts that making an adjustment with a flexible cable becomes so difficult as to be of doubtful value. Furthermore, cable-operated systems are especially susceptible to becoming frozen when a truck is driven in icy or known conditions.

Even if a driver succeeds in obtaining a suitable adjustment of his or her outside mirrors before starting on a trip, the mirror-adjustment process is not necessarily over. For example, one situation that frequently occurs in urban areas is that a driver of a tractor/trailer rig wants to make a right turn; and often the driver feels compelled to wing out into the left lane in order to provide sufficient clearance for the trailer as the turn is executed. Without such wide turns in a congested area, the trailer might come into contact with a traffic light standard, a fireplug, a sign or a telephone pole. But even though most trailers carry warning signs to let motorists know of the risks of trying to pass a turning tractor/trailer rig on the right while it is turning right, there are still too many impatient automobile drivers who think they have just enough time to "squeeze by" before the tractor actually begins its turn. The result is sometimes a seven-foot automobile that's been crushed and squeezed sideways into a four-foot space between a trailer and a telephone pole.

While it is true that the driver of such an automobile must usually bear most of the blame for causing such accidents, it would be nice if the driver of the tractor could glance at what's alongside his or her trailer as the right turn is being executed. Of course, such visibility would be available only if the mirror could be temporarily swung outwardly, because tractor mirrors are conventionally adjusted to provide the driver with a view of what's at the rear of a trailer—not what is immediately alongside it. And after the turn has been completed, the tractor's mirror needs to be swung inwardly (about a vertical axis) so that the driver is again viewing what's at the trailer's rear.

To meet the above requirements, some mirrors have been rotated by small motors that are positioned immediately behind the reflective surface of a mirror. Examples of such "motorized'8 mirrors are disclosed in U.S. Pat. No. 3,132, 201 to Bertell et al. entitled "Outboard Rear Vision Mirror For Trucks And The Like," U.S. Pat. No. 3,610,736 to Bateman entitled "Power-Driven Rear View Mirror," and U.S. Pat. No. 4,464,016 to Weber et al. entitled "Power-Adjusted Mirror With Motor On Housing And Offset Center Wheel." While the general concept of each of these prior art mirrors was perhaps good, there has been a major difference between what seems reasonable in theory and what works in the real world. In fact, just a few years ago a major manufacturer of mirrors for trucks, tractors and buses introduced a mirror assembly which it assumed would address all of the problems of inadequate visibility that were mentioned above. But no matter how commendable the goal, the new mirror was a total failure; and within two years there had been a 100 percent recall of all mirrors that had been shipped to customers. And this recall was not of minor proportions; it involved thousands of very expensive mirrors.

Perhaps one reason for the surprising 100 percent failure of the aforementioned mirror was the failure of the manufacturer to recognize that most truck drivers (and the companies that hire them) usually like to operate clean rigs. And not long ago many people in the trucking industry discovered that a mild acidic solution will clean the exterior of a truck and trailer much faster and more thoroughly than simply pressurized water. Therefore, many maintenance facilities and truck-washing stations began to add a small amount of acid to their wash water. For those electrical parts that were not protected against the presence of acid, even in a weak solution, the results were corrosion and rather quick failure. It will be seen, therefore, that there has remained a need for a dependable and practical apparatus for rotating an external mirror, to improve visibility behind and alongside a long vehicle. It is an object of this invention to satisfy such a need.

It is a further object to provide an exterior mirror for trucks and similar large vehicles that is not subject to failure from the cleaning liquids that can enter a mirror housing and eventually migrate to where they contaminate everything within the housing.

Still another object is to provide a rotatable mirror that can be mounted on the kind of vehicle that is known to experience severe vibration, but which can be mounted so tightly that the mirror can still give the driver a stable image when he or she wants to see what's happening at the rear of the vehicle.

One more object is to provide a rotatable mirror with a clutch that can protect a motor that is used to rotate the mirror—if the mirror comes into contact with an immovable object (such as the mirror mounting bracket).

These and other objects will be apparent from a reading of the specification that follows, together with the claims that are appended thereto—and the accompanying drawings.

BRIEF DESCRIPTION OF THE FIGURES OF THE DRAWING

FIG. 8 is an elevational view of a top mounting bolt which adds increased stability to the mirror assembly as installed on a truck or the like.

BRIEF DESCRIPTION OF THE INVENTION

Figure 1:
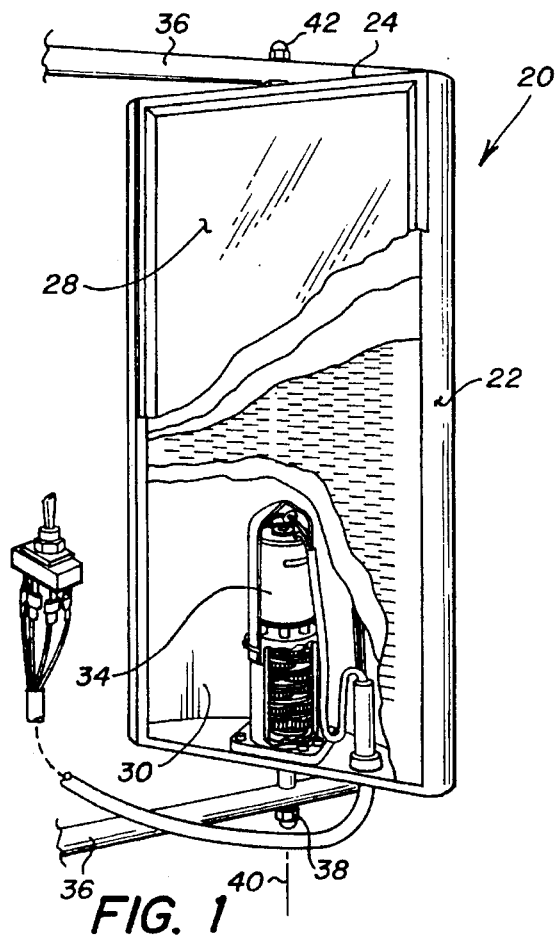
FIG. 1 is a perspective view, partially sectioned, of an exemplary mirror that is adapted to be mounted on the exterior of a large wheeled vehicle, e.g., a Class 8 tractor.

In brief, a mirror assembly is disclosed which is adapted to be rotatably mounted with respect to some support structure; the structure may be static or mobile. When the support structure is a large truck or the like, the assembly will usually be mounted in such a way that it rotates about a vertical axis. The assembly includes a rotatable housing having a top and a bottom, and which is bounded on its front by a mirror and bounded on its rear by a wall that is spaced from the rear surface of the mirror. At least one fixed mounting bolt is employed for supporting the rotatable housing with respect to the support structure. The bolt has a longitudinal axis which establishes an axis of rotation for the housing. In most applications two longitudinally aligned mounting bolts will be employed, because two aligned and widely spaced bolts provide the greatest stability for the housing.

A small motor (e.g., an electrical motor) is mounted within the housing in such a way as to cause relative movement between the housing and the fixed mounting bolt when power is applied to the motor. Power is routinely applied to the motor with normally-off, momentary-on switches located adjacent a driver's or operator's seat. A transmission is connected between the motor and the mounting bolt for affecting the rate at which the mirror housing will rotate with respect to the mounting bolt when power is applied to the motor. The preferred motor is a fractional horsepower DC motor that rotates at a relatively high speed (e.g., 6000 RPM); but the transmission ideally has a 12,000 to 1 ratio, so that the housing will rotate at a relatively low speed (e.g., one-half RMP).

A clutch is associated with the motor and transmission in order to preclude damage—if electrical power is applied to the motor but the housing is incapable of moving. For example, the clutch will slip and preclude damage to the motor if the housing is being rotated as a result of the application of electrical power and the housing comes into contact with an immovable object. The preferred clutch includes two pairs of metallic spring washers of the Belleville type; such washers have essentially parallel concave and convex faces, and are capable of being deformed in such a way as to store significant energy. The two washers of a given pair are in contact with each other and are oriented in the same direction, such that there will be a substantial area of metal-to-metal contact between the washers of each pair. A lubricant such as graphite is advantageously placed between the washers of each pair, so that relative movement—when it occurs—will be both predictable and smooth.

A liquid-proof shroud (e.g., a covering of low density PVC) is ideally placed over the motor, so that any liquids that might somehow get into the housing will flow harmlessly over the shroud. Ideally, the shroud will even extend downwardly over much of the transmission housing, to add more protection against contact with corrosive liquids, etc.

DETAILED DESCRIPTION OF A PREFERRED EMBODIMENT

Referring initially to FIG. 1, a mirror assembly 20 is shown in a configuration that makes it particularly suitable for being mounted with respect to a large vehicle such as a truck, bus, etc. The assembly includes a rotatable housing 22 having a top 24 and a bottom 26. The housing 22 is preferably made of stainless steel and may be said to be bounded on tis front by a mirror 28 (typically glass), and bounded on its rear by a wall 30 that is spaced from the rear surface of the mirror. It is this space (typically about 1.5 inches deep) between the rear wall 30 and the mirror 28 that provides room for internally mounting a motor/transmission assembly 34. If desired, this space may also contain heater to keep known and ice from collecting on the mirror's exterior surface, as well as an internal light bulb to provide illumination through a lens in the rear wall. For installation on trucks and the like as a standard-sized item, the glass mirror will be rectangular and have a height of about 16 inches.

The housing 22 has a generally vertical orientation in FIG. 1, so that it may be installed on a conventional "West Coast" mirror bracket 36. When installed, the mirror assembly 20 will likely appear much like the assembly shown in U.S. Pat. No. 4,464,016 to Weber et al. As such, there is a fixed, downwardly pointing mounting bolt 38 that is used to connect the housing 22 to the bracket 36. The bolt 38 has a longitudinal axis represented by line 40, which establishes an axis of rotation for the housing 22. For severe environmental situations such as those regularly encountered with heave trucks and the like, an additional mounting bolt 42 is provided at the top of the housing. This second bolt 42 is aligned with the first bolt 38 so that both are positioned on the same longitudinal axis 40.

Figure 2:
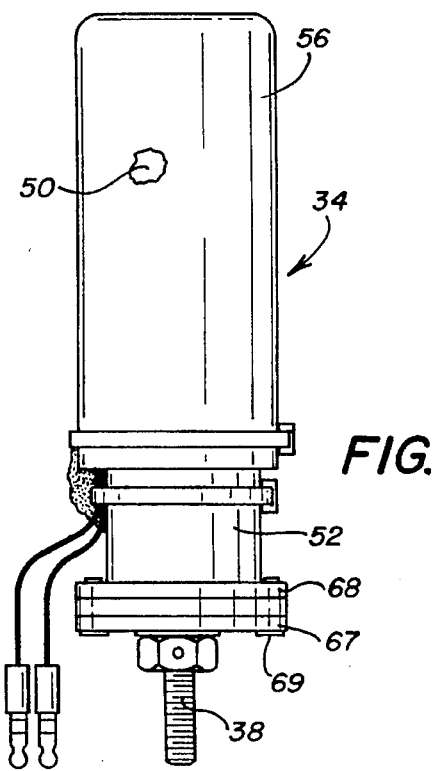
FIG. 2 is an elevational view of a motor/transmission assembly of the type that is particularly useful in the practice of this invention.
Figure 3:
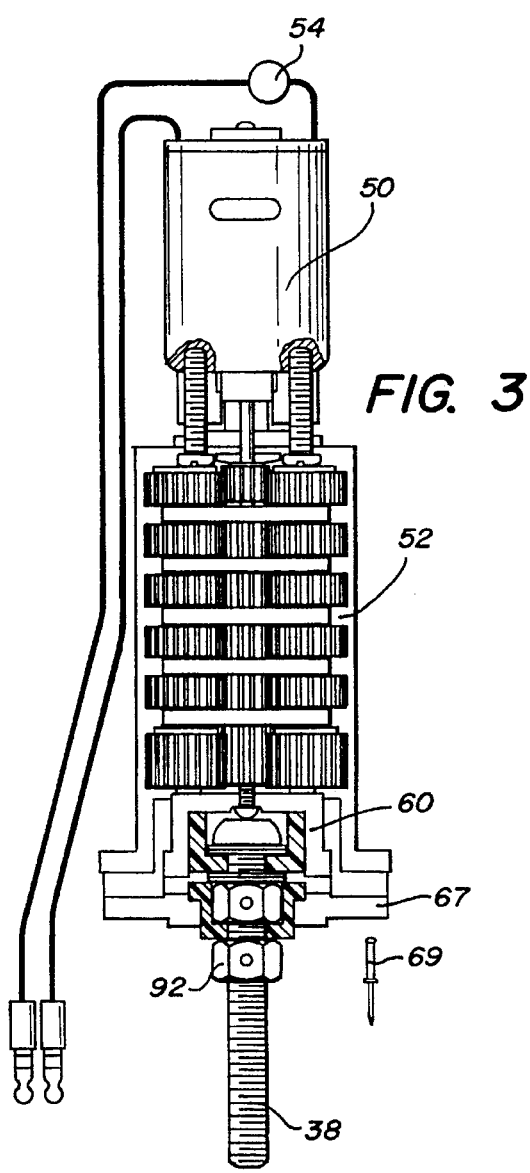
FIG. 3 is a cross-sectional front elevational view of the motor/transmission assembly shown in FIG. 2, with the protective shroud omitted and additionally showing the clutch assembly and mounting bolt.

Referring next to FIGS. 2 and 3, the motor assembly 34 includes an electric motor 50, which preferably is a high-speed DC (direct current) fractional horsepower motor having a nominal rotation speed of about 6000 RPM (revolutions per minute) at no load. Such motors are manufactured by Mabuchi Motor Company and sold at the model number RS 540. Positioned immediately below the electric motor 50 and aligned so that its output is coaxial with the motor's shaft, is a transmission 52, which preferably is of the planetary gear type. Such a planetary transmission having six stacked sections is shown assembled in FIG. 3 and exploded in FIG. 4; it has sufficient sun gears, planetary gears and carriers as to effect a speed decrease of about 12,000 to 1. This can be achieved with parts that are molded of 33% glass-filled Type 6/6 nylon. The housing for the transmission is also molded of the same high-strength glass-filled nylon, because it has internal teeth that function as the ring gears of the transmission 52. The net result of using such a transmission 52 is to produce an output of about one-half RPM, which has been found to be about maximum in order to preclude a driver from losing his orientation when the mirror is being rotated. That is, it would perhaps be easier to simply step down the motor speed of 6,000 RPM to about 1 RPM of housing rotation. But experiments have shown that it is too easy for a driver to lose his sense of spatial relationships when a mirror housing moves that fast. In effect, it becomes possible for a driver to observe something in his rear view mirror but not have any clue as to how close the observed thing is to the rear of his truck or trailer. With a slower rotational speed, the driver keeps a better perspective on what he is looking at as the mirror rotates. Expressed in other words, the driver keeps a better mental picture of where things are with respect to his rig—when the rotation speed is slow.

While achieving such a substantial speed reduction, the transmission 52 provides a concurrent increase in output torque. In accordance with the preferred embodiment of the invention, the motor/transmission assembly 34 will provide a potential torque of about fourteen to eighteen foot pounds.

If the housing of an electric motor 50 is held static with respect to the world and electrical power is applied to the motor, the motor's shaft and anything connected to that shaft must, of necessity, rotate. Conversely, if the support bolt 38 is held fixed with respect to the world, the motor 50 and transmission 52 must rotate with respect to the world, the motor 50 and transmission 52 must rotate with respect to the bolt 38 when power is applied. This latter arrangement is what is utilized with the present invention. Also, the motor 50 is rigidly connected to the mirror housing 22 (through the transmission), with the result that the housing 22 will rotate with the motor's housing and the transmission. Hence, when power is applied to the motor 50, rotational movement will be achieved between the housing 22 and a fixed mounting bolt 38.

Figure 4:
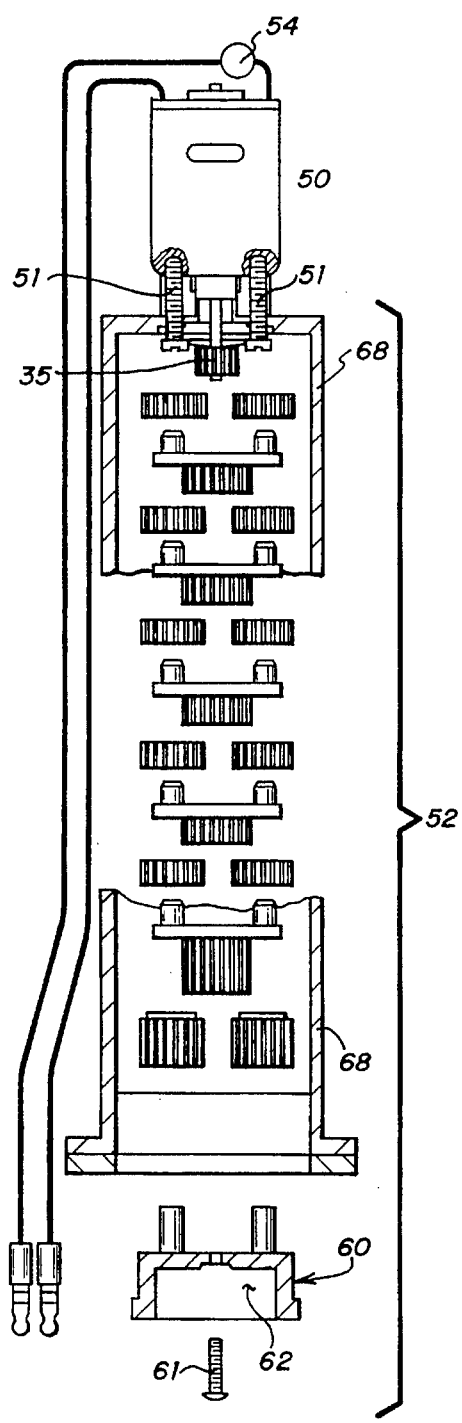
FIG. 4 is an exploded view of the transmission assembly, showing the several gear segments that provide a 12,000 to 1 reduction ratio.

Referring additionally to FIGS. 4 and, the lowermost of the series of elements in the transmission 52 is a rear carrier 60, which has a downwardly facing cavity 62 whose shape is hexagonal—so that it may engage a hexagonal element 64 that forms a part of the clutch assembly 70. Those skilled in the art will appreciate that the gear carrier 60 may be aptly described as a structural member that is shaped to serve as a powered output member when the motor 50 is operated. A clutch is necessary in order to optimally practice this invention, because there are many instances in which a mirror assembly 20 can be turned about its axis of rotation to the extent that it encounters an immovable obstacle. An always-present and potentially damaging obstacle (as far as the motor 50 and transmission 52 are concerned) is the mirror bracket 36, if the mirror housing 22 is rotated too far. That is, the vertical portion of a C-shaped bracket 36 is normally so close to the housing 22 that it is not possible to rotate a housing anywhere near 360 degrees with respect to the bracket. So if the housing 22 had been rotated to the extent that it has bumped into the bracket 36, there should be a clutch that will sip in order to allow the motor and the transmission to continue to turn even when the housing 22 will not.

Figure 5:
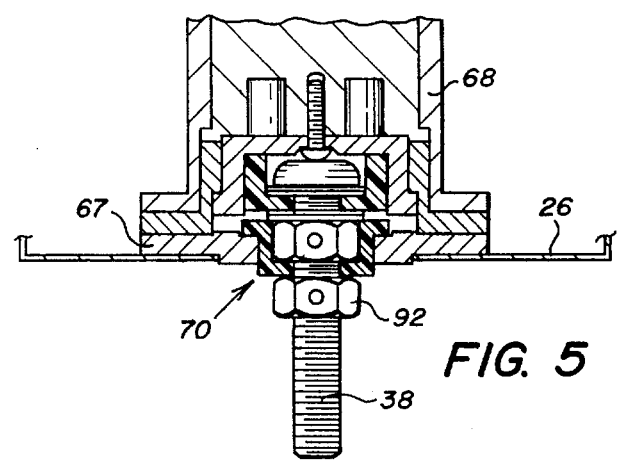
FIG. 5 is a slightly enlarged view of the clutch assembly (and adjacent elements) in the condition in which the clutch assembly would be installed.
Figure 7:
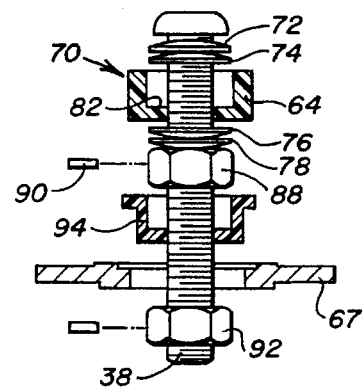
FIG. 7 is a front elevational view of the elements shown in FIG. 5, except that they are spread out in the manner of an exploded view, in order to better show the spatial relationship of the various parts—and showing the spring washers in their relaxed condition.
Figure 6:
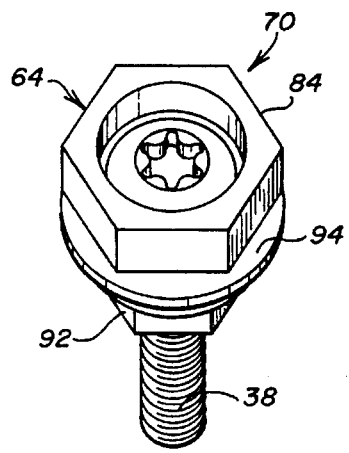
FIG. 6 is a perspective view of the clutch assembly shown in FIG. 5.

Turning next to FIGS. 5 and 7, the clutch 70 includes first and second pairs of metallic spring washers 72, 74 and 76, 78. Such washers are commonly referred to as Belleville washers, and they each have a concave and a convex face. The two washers 72, 74 of one pair are in contact with one another and are oriented in the same direction. That is, both concave surfaces of a pair of washers are oriented downwardly and both convex surfaces are oriented upwardly. As a result of this arrangement, the convex surface of washer 74 is in intimate contact with the concave surface of washer 72. This produces a substantial area of metal-to-metal contact between the washers 72, 74. Turning next to the lower washers 76, 78, their two concave faces are oriented the same way—upwardly, such that they also have a substantial area of metal-to-metal contact.

Of course, the concept of having a clutch, per se, in association with a motorized mirror is not new. Neither is it new to employ frusto-conical or Belleville washers as the major elements of a holding mechanism which is suggestive of a clutch. For example, U.S. Pat. No. 3,730,474 to Bowers entitled "Mirror Positioning Drive" and U.S. Pat. No. 4,135,694 to Stegenga et al. entitled "Pivot Support Bracket" both show the use of Belleville washers—although without any kind of a motor to rotate the mirror housing. But both the Bowers and Stegenga references teach that when more than one spring washer is present, they should be arranged in an alternately inverted order. In effect, the Bowers and Stegenga patents are teaching edge-to-edge contact between oppositely facing washers, while this disclosure is teaching surface-to-surface contact between commonly facing pairs of washers.

Also new in the arrangement described herein is the teaching of a relationship between the motor 50 and transmission 52 and the clutch 70 wherein the motor/transmission 34 has the capacity to produce torque that is at least fifty percent more than the value at which slippage is permitted by the clutch. As will be explained in more detail hereinafter, the clutch 70 has a torque beyond which slippage is assured—of about seven foot-pounds. The motor/transmission 34 should therefore be sized in order to provide torque of at least 10½ foot-pounds. And in the preferred embodiment, the torque provided by the motor/transmission assembly is at least fourteen foot-pounds.

Sandwiched between the respective pairs of washers 72, 74 and 76, 78 is the molded plastic element 64, which has a generally disc-shaped and planar central portion 82 (with a central aperture) and an upstanding hex-shaped wall 84. The size and shape of the upstanding wall 84 is such as to mate closely with the downwardly facing cavity 62 in element 60, in order that these parts will be held against relative rotation when they are pushed together. When a button-head bolt 38 is passed through an aperture in the center of portion 82, said portion will be captured between the two pairs of Belleville washers. A nut 88 can then be tightened with respect to the bolt in order to achieve a desired amount of pre-load on the hex member 64. A pin 90 is advantageously used to fix the nut 88 with respect to bolt 38 after the nut is tightened, so that the nut cannot shake loose, even when the assembly 20 is subjected to the extreme vibrations that are characteristic of 18-wheel tractor/trailer rigs. An additional nut 92 is shown in FIG. 5; this nut serves as a mechanical stop and isolates the transmission from inordinate loading as the mirror assembly is installed on a mirror bracket of frame. A plastic retainer 94 functions as a seal against the entry of water through the bottom of the assembly 34.

Referring particularly to FIG. 7, which is essentially an exploded view of elements shown in FIG. 5, graphite or an equivalent lubricant is interposed between the first pair of Belleville washers 72, 74 as well as between the second pair of washers 76, 78. The washers are shown exaggerated in this particular view; in reality, the height of a ⅝ inch OD washer may be only about 0.025 inch above its compressed (flat) height. The presence of a lubricant like graphite assures a repeatable and dependable slippage between hex element 64 and fixed mounting bolt 38, under variable temperature and environmental conditions, if slippage is necessary. The predictability and repeatability of this slippage is believed to be very important in the manufacture of a successful mirror assembly 20. If the slippage point is too low, the mirror housing 22 can move in response to vehicle vibration or wind loads as the vehicle travels down a highway at a high rate of speed. Resonant vibration can also cause a mirror 28 to shake and produce a blurred image of things that are reflected in the mirror. In general, it has been found that the mirror housing 22 should be able to resist a lateral slip torque of at least six foot-pounds, and preferably seven foot-pounds, in order to provide optimum mirror performance.

It is also significant that the graphite lubricant is placed between two Belleville washers, so that relative movement can be essentially guaranteed between those washers—at the appropriate time. If there were only a single washer that was in contact with a plastic member, it would be possible for the metal washer to dig into a softer plastic and create more interference than was intended by a designer. And it should be remembered that if the clutch assembly does not "break free" and allow slippage to occur at an appropriate time, there is a risk that an electric motor 50 or transmission 52 could be damaged.

Perhaps it should be mentioned that experiments have been conducted in order to find the optimum number and orientation of spring washers for use as the operative clutch elements. For example, test have been run with pairs of Belleville washers arranged with all kinds of combinations, including convex surfaces confronting one another, concave surfaces confronting one another, convex surfaces facing concave surfaces, etc. None of the spatial arrangements that are physically possible has given the high slippage value that can be achieved when both washers are oriented the same way. Hence, the arrangement illustrated in FIG 7 does constitute the preferred arrangement.

Figure 8:
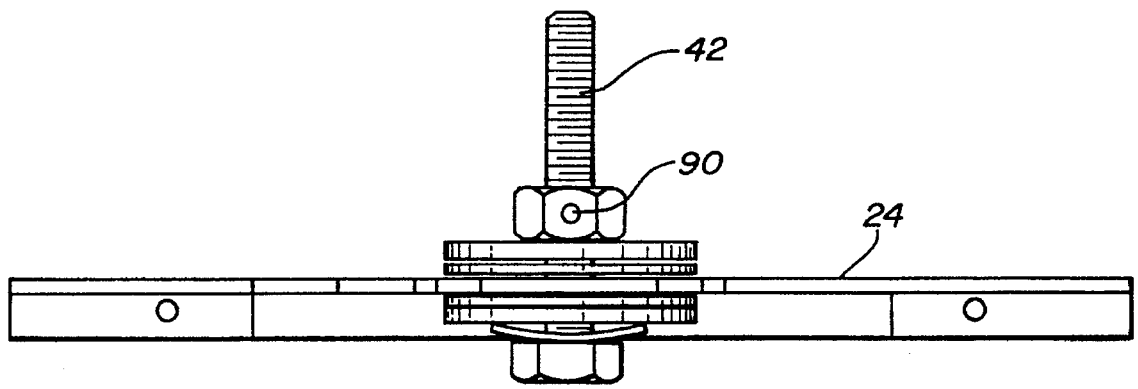
Figure 9:
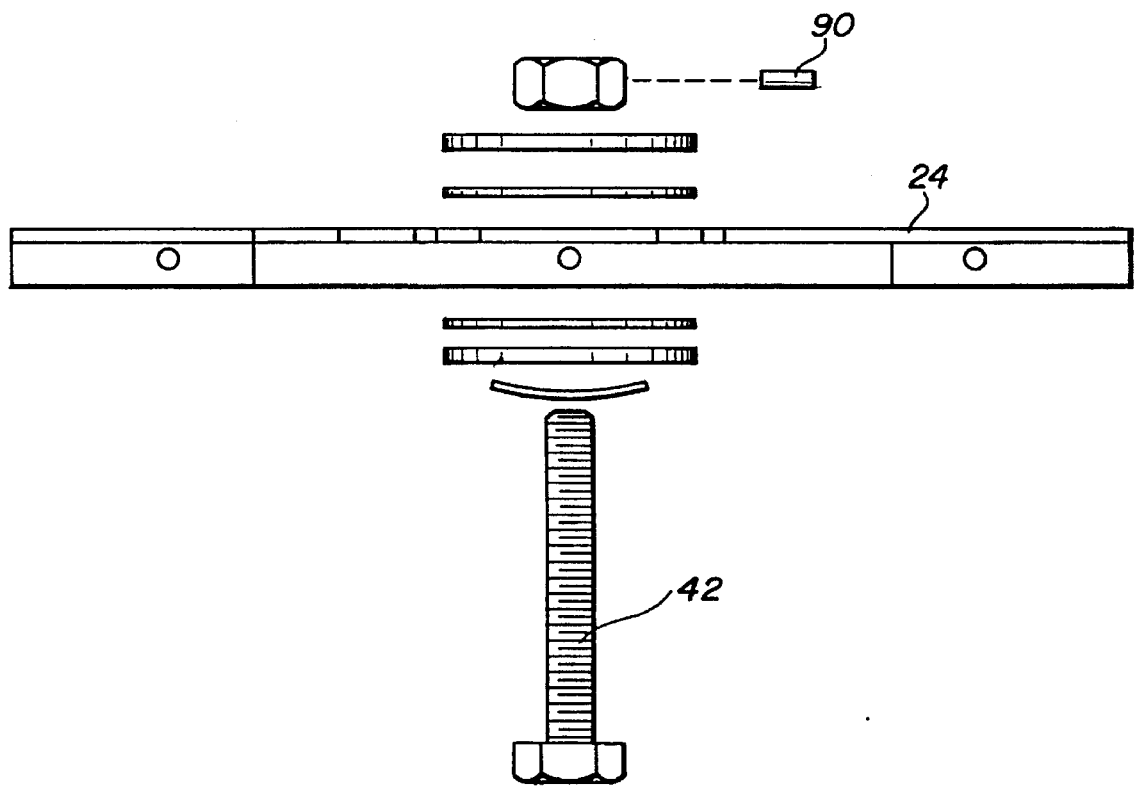
FIG. 9 is an exploded view of the matter shown in FIG. 8.

While all of the driving force for rotating a mirror assembly 20 is achieved through the motor/transmission 34, and that combination is located at the bottom of the housing 22, it is desirable to stabilize the housing 22 by providing a second mounting bolt between the housing's top 24 and the top of the bracket 36. This top bolt 42 is obviously positioned above bolt 38, and it is aligned with bolt 38. The wide spacing between bolts 38, 42 helps ensure that the housing 22 will be firmly held. As with the pre-load that is achieved by turning nut 88 tightly on bolt 38, it is desirable to securely tighten a locking nut on the upper mounting bolt 42, with the housing top 24 being captured by the locking nut. A ⅛ inch locking pin (like pin 90) which passes through a nut and at least partially into bolt 42 can be used to ensure that a truck driver or maintenance person cannot interfere with a pre-load that has been established by the manufacturer. A pre-load of about 18 inch-pounds of torque on a Belleville washer at the top of the mirror has been found to successfully aid in inhibiting vibration as a truck rolls down a highway. A molybdenum-filled fiberglass washer above and below the housing's top 24, and two stainless steel washers, will protect against the leakage of liquids into the top of the mirror housing. An auxiliary nut may then be freely used by a mechanic in the field to secure the upper bolt 42 to the bracket 36. This top mounting construction is shown in FIGS. 1, 8 and 9.

While steps have been taken with the present design to ensure against the entrance of any kind of liquid into the housing 22, it seems that there are always circumstances that are difficult to protect against. For example, if a truck driver directs a stream of high-pressure cleaning liquid at a grommet that surrounds an electrical wire leading into the housing 22, it is possible that some liquid can get into the housing. In accordance with the preferred embodiment of this invention, a liquid-impervious protective shroud 56 is placed over the top of the motor 50, as shown in FIG. 2. An optimum shroud 56 extends downwardly over the entire surface of the motor and is sealingly joined (with epoxy or the like) to the exterior of the transmission housing. This protection for the motor/transmission assembly 34 is enhanced when the shroud is so tightly fitting so as to be more aptly called a protective sheath. Also, the material from which such a sheath is manufactured is preferably acid resistant and heat resistant, and a low-density polyvinyl chloride is such a material. Of course, it is the absence of a single supporting member (like that shown in U.S. Pat. No. 3,343,779 to Beach) that makes it possible to dependably seal the top of the motor and ensure against potential damage from corrosive liquids, etc. Expressed in other words, a single supporting shaft for a rotatable mirror housing probably can never be dependably sealed (forever) to keep a migrating liquid out of an internal motor. So, dividing the support function into two spaced but aligned bolts 38, 42 makes it possible to place a protective sheath over a motor that is connected to the lower bolt. In this way, the possible entrance of a corrosive liquid into a mirror housing will not be fatal to devices within that housing.

The particular construction disclosed herein also makes it possible to provide a circuit breaker at the top of the motor 50, where it can also be sealed within the liquid-proof shroud 56. By placing such a circuit breaker (such as a positive temperature coefficient thermistor) at the top of a motor 50, the mirror assembly 20 can be protected against the abuse that could come from someone's idle curiosity about what would happen if a motor's "on" switch were pressed and held for, say, ten or fifteen minutes. The heat generated from prolonged application of power to the motor 50 will cause the PTC thermistor to increase its resistance by a substantial factor, e.g., up to 100, causing most of the voltage drop to occur across the thermistor and "unloading" the motor.

Other situations which sometimes arise in the real world involve attempts at vandalism by someone who physically grabs a mirror housing 22 and tries to turn it by hand. If such an attempt should be made with the construction disclosed herein, the clutch 70 will yield and allow the housing 22 to rotate without causing any stain on the transmission 52. Of course, this built-in ability to slip is an advantage to a truck driver if a fuse blows or some other power interruption occur, such that the mirror cannot be rotated by turning a switch on. At least a driver can manually set the mirror at a desired position and leave it, without worrying about stripping any gears during the process of setting the mirror. Similarly, if a driver is backing a truck into a narrow space and the mirror housing 22 strikes an adjacent trailer or building, the resistance load on the housing can be absorbed through the clutch in order to protect the transmission and motor.

Referring again to FIGS. 2, 3, 4, and 6, a preferred technique for putting together the operative elements of a mirror assembly involves stacking the elements in a straight line and connecting them together with simple fasteners such as screws or pop rivers. As shown in FIG. 3, the motor 50 is connected to the transmission housing 68 with screws 51. As indicated in FIG. 4, a pinion gear 35 serves as the active (i.e., driving) or input element for the motor/transmission assembly 34. Pinion 35 rotates at the speed of the motor shaft, which is 6000 RPM in the preferred embodiment having an electric motor. Each of the six levels of gear reduction is effective to reduce the input speed by a factor of 4.75, and the torque correspondingly goes up by a factor of 4.75. The series of planetary gears and carriers with attached sun gears is effective to reduce the rotational speed of element 60 to one-half RPM. Gear carrier 60 is secured to the final level of cooperating gears with screw 61. Screw 61 locks the final gear reduction stage together to prevent any of the gears from trying to pull away from the driving carrier because of the high torque at this level.

By providing a slip fit between hex element 64 and cavity 62, the clutch unit can be operatively associated with the motor/transmission assembly 34 without the necessity for any special adjustments or connections. The clutch 70 is not likely to ever require replacement, because it is inherently a non-war item in most installations. That is, a truck driver who is careful with his mirror assembly 20 (and never gets close to an obstacle) may never need to take advantage of the slipping capability of the clutch during a truck's lifetime. In this respect, the clutch 70 may be thought of as being analogous to a safety valve on a hot water heater; it gives people comfort and reassurance to known that it is present, but it may never be used. One reason that the clutch 70 is not likely to ever wear out or require replacement is that it is shielded internally of the transmission housing 68, where there is essentially nothing that can get to it that might cause contamination, etc.

To maintain the clutch unit and its associated bolt or stud 38 in the position indicated in FIG. 2, a plurality of pop rivets may be used to connect a bottom plate 67 to the transmission housing 68. An exemplary pop rivet 69 is shown in FIG. 3 with the orientation that is appropriate for making a physical connection between bottom plate 67 and transmission housing 68. Aluminum pop rivers for this particular use are appropriate, and stainless steel pop rivets are advantageously used to connect the entire assembly to the housing bottom 26.

While a 6,000 RPM electric motor 50 provides the preferred motive power for rotating a mirrored surface, there is nothing magical about electrically driven motors, per se. Hence, if any other kind of high-torque motor can be found that will provide a output of about one-half RPM, either alone or in combination with some kind of speed reducer, then the transmission 52 as disclosed herein would not be required. So regardless of whether the motor is driven by electricity, air or hydraulics, etc., the principles disclosed herein are equally valid.

While only a preferred embodiment of the invention has been disclosed herein in great detail, it should be apparent to those skilled in the art that variations and modifications could be made in the illustrated structure—without departing from the spirit of the invention. Accordingly, it should be understood that the invention should be measured only by the scope of the attached claims.

What is claimed is:

1. A mirror assembly adapted to be rotatably mounted with respect to a support structure comprising:

a. a rotatable housing having a top and a bottom, and being bounded on its front by a mirror and bounded on its rear by a wall that is spaced from the rear surface of the mirror;

b. at least on fixed mounting bolt for supporting the rotatable housing with respect to the support structure, and said bolt having a longitudinal axis which establishes an axis of rotation for the housing;

c. a motor connected to the housing so as to cause relative movement between the housing and the fixed mounting bolt when power is applied to the motor; and d. a clutch interposed between the fixed mounting bolt and the rotatable housing, said clutch being operable to normally cause the housing to rotate when power is applied to the motor, and said clutch being operable to slip in order to preclude damage when power is applied to the motor but the housing is incapable of moving because it has come into contact with some immovable object, and said clutch including two pairs of metallic spring washers wherein said washers are of the Belleville type and which have concave faces, and wherein the two washers of each pair are in contact and are oriented in the same direction, whereby there is a substantial area of metal-to-metal contact between the washers of each pair of washers.

2. The mirror assembly as claimed in claim 1 wherein the support structure is a vehicle and the fixed mounting bolt is located externally of the vehicle, and the mirror assembly being oriented so as to serve as an external rear-view mirror assembly for vehicles.

3. The mirror assembly as claimed in claim 1 and further including a transmission connected between the motor and the mounting bolt for affecting the rate at which the housing will rotate with respect to the mounting bolt when power is applied to the motor, such that the motor can rotate at a relatively high speed and the housing will rotate at a relatively low speed.

4. The mirror assembly as claimed in claim 3 wherein the motor is a fractional horsepower electrical motor having a nominal rotational speed of about 6000 RPM, and the transmission includes a plurality of gears that are effective to reduce the rotational speed of the housing with respect to the mounting bolt to about one-half RPM.

5. The mirror assembly as claimed in claim 1 wherein the fixed mounting bolt is one of two mounting bolts that supports the housing, and wherein the bolts are oriented such that their longitudinal axes are co-axial, and one of the bolts is positioned above the housing and the other is positioned below the housing.

6. The mirror assembly as claimed in claim 1 wherein the mounting bolt is oriented with respect to the supporting structure in a generally vertical mode.

7. The mirror assembly as claimed in claim 1 wherein the two pairs of spring washers are oriented such that the concave faces of the two pairs face each other.

8. An external mirror assembly configured to be rotatably mounted on a vehicle, the vehicle being of the class that includes trucks, buses and large recreational vehicles, comprising:
   a. a rotatable housing having a top and a bottom and being bounded on its front by a mirror and bounded on its rear by a wall that is spaced from the rear surface of the mirror;
   b. at least one fixed mounting bolt, said bolt having a longitudinal axis that establishes an axis of rotation for the housing;
   c. a motor connected to and mounted within the housing so as to produce relative movement between the housing and said at least one mounting bolt when power is applied to the motor; and
   d. a clutch interposed between the fixed mounting bolt and the rotatable housing, said clutch being operable to normally cause the housing to rotate when power is applied to the motor, and said clutch being operable to slip in order to preclude damage when power is applied to the motor but the housing is incapable of moving because it has come into contact with some immovable object, and said clutch including two pairs of metallic spring washers of the Belleville type and having concave faces, and wherein the two washers of each pair are in contact and are oriented in the same direction, whereby there is a substantial area of metal-to-metal contact between the washers of each pair of washers.

9. The mirror assembly as claimed in claim 8 and further including a transmission mounted between the motor and the mounting bolt for affecting the rate at which the housing will rotate with respect to the fixed mounting bolt when power is applied to the motor, such that the motor can rotate at a first speed and the housing will rotate at a second speed.

10. The mirror assembly as claimed in claim 8 wherein the two pairs of spring washers are oriented such that the concave surfaces of one pair of washers are oriented in a given direction and the concave surfaces of the other pair of washers are oriented in the opposite direction.

11. The mirror assembly as claimed in claim 8 wherein the two pairs of spring washers are oriented so that the concave surfaces of one pair are oriented toward the concave surfaces of the other pair.

12. The mirror assembly as claimed in claim 8 wherein the two pairs of spring washers are located on opposite sides of an plastic element that is secured to the mounting bolt.

13. The mirror assembly as claimed in claim 8 and further including a second fixed mounting bolt, and the second mounting bolt being positioned above the first fixed mounting bolt, and said bolts are aligned but spaced enough apart to support the rotatable housing therebetween.

14. The mirror assembly as claimed in claim 13 wherein the motor is located near the lower mounting bolt and is vertically above and in line with the lower mounting bolt, and wherein the motor has an axis of rotation that is coincident with the longitudinal axis of the lower mounting bolt.

15. The mirror assembly as claimed in claim 8 and further including a liquid-impervious, downwardly opening shroud covering the top and sides of the motor, said shroud having having a continuous upper surface with no openings that would render the shroud susceptible to leakage of liquids from the top of the assembly, whereby the motor is rendered immune to the entrance of any hazardous liquids that might somehow enter the housing above the motor.

16. The mirror assembly as claimed in claim 8 wherein the clutch has a given torque at which slippage is permitted, and wherein the motor has the capacity to produce torque that is at least 50 percent more than said given torque of the clutch.

17. The mirror assembly as claimed in claim 16 wherein said given torque of the clutch beyond which slippage is assured is about seven foot-pounds, and the motor is capable of producing torque of at least fourteen foot-pounds.

18. The mirror assembly as claimed in claim 8 and further including a graphite lubricant interposed between the respective pairs of spring washers.

19. The mirror assembly as claimed in claim 8 wherein the fixed mounting bolt is engaged with a head element that has angular sides, and wherein torque from the motor is delivered through a downwardly facing cup that is internally configured to envelop and mate with said head element, such that applying power to the motor will cause joint movement of the cup and the head element, whereby holding the mounting bolt static will cause the motor housing to rotate about an axis through the mounting bolt when power is delivered to the motor.

20. The mirror assembly as claimed in claim 8 and further including a circuit breaker installed in series with the motor in order to prevent failure of the motor.

21. The mirror assembly as claimed in claim 20 wherein the circuit breaker is located internally of a liquid-impervious shroud that covers the motor and extends downwardly over the motor and is sealed in order to preclude the entrance of a liquid into the motor.

22. The mirror assembly as claimed in claim 8 wherein the mirror is principally made of glass and is configured in the shape of a rectangle, and wherein the longer side of the glass is oriented vertically when the mirror assembly is mounted on a vehicle, and wherein the longer side of the glass is approximately 16 inches long.

23. The mirror assembly as claimed in claim 8 wherein a liquid-impervious shroud is in intimate contact with the motor in the manner of a sheath, and the material from which the shroud is formed is low density polyvinylchloride having a durometer rating of about 70 to 80.

24. A mirror assembly adapted for mounting on a support structure, comprising:
   a. a rotatable housing having a mirrored surface that is oriented for reflecting an image of an object that is behind an observer;
   b. means for supporting the rotatable housing with respect to the support structure, said means providing for rotation about an axis;

c. a motor selectively operable for causing the housing to rotate about its axis of rotation;

d. a transmission connected between the motor and the means for supporting the housing in order to reduce the output speed from the motor to a significantly lower sped of rotation for the housing, said lower speed corresponding to an increase in torque output from the transmission, and the transmission having a structural member that is shaped to serve as a powered output member when the motor is operated; and e. a clutch assembly interposed between the transmission and the means for supporting the housing, said clutch being effective to prevent damage to the transmission and the motor when power is applied to the motor but the housing is incapable of rotating because of physical contact with an obstacle, and the clutch assembly having a longitudinal axis and having Belleville washers that are held tightly together by a longitudinal force, and the longitudinal force being sufficient to transmit a predictable amount of torque through the Belleville washers, and the Belleville washers being designed to experience slippage when said predictable amount of torque has been exceeded, and the longitudinal force being completely resisted within the clutch assembly, such that the clutch assembly it a self-contained unit, and the clutch assembly having an exterior configuration that is complementary to the shape of the powered output member of the transmission and being engageable with said powered output member with a slip fit.

25. The mirror assembly as claimed in claim 24 wherein the powered output member of the transmission constitutes one element, and wherein the clutch assembly constitutes a second element, and wherein the two elements each have a hexagonal cross-section and are engaged with a slip fit.

26. The mirror assembly as claimed in claim 24 wherein the motor is an electric motor and wherein the speed of rotation of the housing is about one-half revolution per minute.

27. The mirror assembly as claimed in claim 24 wherein the predictable amount of torque that can be transmitted by the clutch assembly is about seven foot-pounds, whereby the application of more than about seven foot-pounds of torque through the clutch assembly will result in slippage between the Belleville washers in the clutch assembly.

* * * * *